(12) United States Patent
Gibbs et al.

(10) Patent No.: US 12,291,318 B2
(45) Date of Patent: May 6, 2025

(54) POWERTRAIN FOR AN AMPHIBIAN

(71) Applicant: Gibbs Technologies Limited, Nuneaton (GB)

(72) Inventors: Alan Timothy Gibbs, London (GB); Simon James Longdill, Nuneaton (GB)

(73) Assignee: Gibbs Technologies Limited, Nuneaton (GB)

( * ) Notice: Subject to any disclaimer, the term of this patent is extended or adjusted under 35 U.S.C. 154(b) by 0 days.

(21) Appl. No.: 17/644,254

(22) Filed: Dec. 14, 2021

(65) Prior Publication Data

US 2022/0126970 A1   Apr. 28, 2022

Related U.S. Application Data

(63) Continuation of application No. 16/923,072, filed on Jul. 7, 2020, now Pat. No. 11,214,347, which is a
(Continued)

(30) Foreign Application Priority Data

Jun. 8, 2015 (GB) .................................... 1509933

(51) Int. Cl.
*B63H 23/10* (2006.01)
*B60F 3/00* (2006.01)
(Continued)

(52) U.S. Cl.
CPC ........... *B63H 23/10* (2013.01); *B60F 3/0007* (2013.01); *B60F 3/0084* (2013.01); *B63H 23/30* (2013.01); *F16D 43/04* (2013.01)

(58) Field of Classification Search
CPC .......... B60F 3/00; B60F 3/0007; B60F 3/003; B60F 3/0061; B60F 3/0069; B60F 3/0076;
(Continued)

(56) References Cited

U.S. PATENT DOCUMENTS 4,357,893 A   11/1982   Frye
5,632,221 A   5/1997   Trenne et al.
(Continued)

FOREIGN PATENT DOCUMENTS

CN         1446154 A      10/2003
CN      203995525 U      12/2014
(Continued)

OTHER PUBLICATIONS

Google search for Integral Speed Transmission, Jun. 28, 2023. (Year: 2023).*
(Continued)

*Primary Examiner* — Andrew Polay
(74) *Attorney, Agent, or Firm* — Price Heneveld LLP

(57) ABSTRACT

A power train for an amphibian operable in land and marine modes includes a prime mover having an integral speed change transmission, at least a first land propulsion unit, at least a first marine propulsion unit, and a power transmission unit including a drive member configured to couple the prime mover to the at least first marine propulsion unit, wherein the prime mover is arranged to drive the at least first land propulsion unit through/via the integral speed change transmission in the land mode, and the prime mover is arranged to drive the at least first marine propulsion unit through/via the power transmission unit in both the marine mode and the land mode.

11 Claims, 1 Drawing Sheet

Related U.S. Application Data continuation of application No. 15/579,720, filed as application No. PCT/GB2016/051692 on Jun. 8, 2016, now abandoned.

(51) Int. Cl.
*B63H 23/30* (2006.01)
*F16D 43/04* (2006.01)

(58) Field of Classification Search
CPC ....... B60F 3/0084; B63H 23/00; B63H 23/02; B63H 23/10; B63H 23/12; B63H 23/14; B63H 23/16; B63H 23/18
See application file for complete search history.

(56) References Cited

U.S. PATENT DOCUMENTS

| | | |
|---|---|---|
| 5,690,046 A | 11/1997 | Grzech, Jr. |
| 6,062,156 A | 5/2000 | Radke et al. |
| 6,666,735 B2 | 12/2003 | Benoit |
| 6,672,916 B1 | 1/2004 | Lent-Phillips et al. |
| 6,712,652 B2 * | 3/2004 | Roycroft ............... B60F 3/0007 440/38 |
| 6,776,672 B2 | 8/2004 | Roycroft |
| 6,821,166 B2 * | 11/2004 | Roycroft ............... B60F 3/0007 440/12.51 |
| 7,713,102 B2 | 5/2010 | Longdill et al. |
| 2002/0098748 A1 | 7/2002 | Roycroft |
| 2003/0060095 A1 | 3/2003 | Gong |
| 2003/0153215 A1 | 8/2003 | Gibbs |
| 2003/0176118 A1 | 9/2003 | Roycroft |
| 2003/0194923 A1 | 10/2003 | Benoit |
| 2011/0275256 A1 | 11/2011 | Gibbs et al. |

FOREIGN PATENT DOCUMENTS

| | | |
|---|---|---|
| DE | 19831324 A1 | 1/2000 |
| EP | 0341009 B1 | 9/1993 |
| GB | 2254831 A | 10/1992 |
| GB | 2420318 A | 5/2006 |
| LU | 84437 A1 | 5/1984 |
| WO | 2008023191 A2 | 2/2008 |
| WO | 2014084074 A1 | 6/2014 |

OTHER PUBLICATIONS

Google search for exact phrase "Integral Speed Transmission", Jun. 28, 2023. (Year: 2023).*
Google ngram search for "Integral Speed Transmission", all books and publications in google library 1800-2019, Jun. 28, 2023. (Year: 2023) (Year: 2023).*
Bing search for Integral Speed Transmission, Jun. 28, 2023. (Year: 2023).*
Ask Jeeves search for "What is an Integral Speed Transmission", Jun. 28, 2023. (Year: 2023).*
Oxford English Dictionary, Definition of Integral, Retrieved from https://www.oed.com/view/Entry/97344?redirectedFrom=integral#eid, Jun. 28, 2023 (Year: 2023).*
2016 Yamaha Grizzly EPS LE—Specs, Price; https://web.archive.org/web/20150906203022/http://www.yamahamotorsports.com/outdoor/models/grizzly-eps-le/specifications; Mar. 31, 2023.
Suzuki Cycles—Product Lines—ATVS—PRODUCTS; https://web.archive.org/web/20120419071605/http://www.suzukicycles.com/Product%20Lines/ATVs/Products/QuadSport%20Z400/2012/LTZ400Z.aspx#Features; Mar. 31, 2023.

* cited by examiner

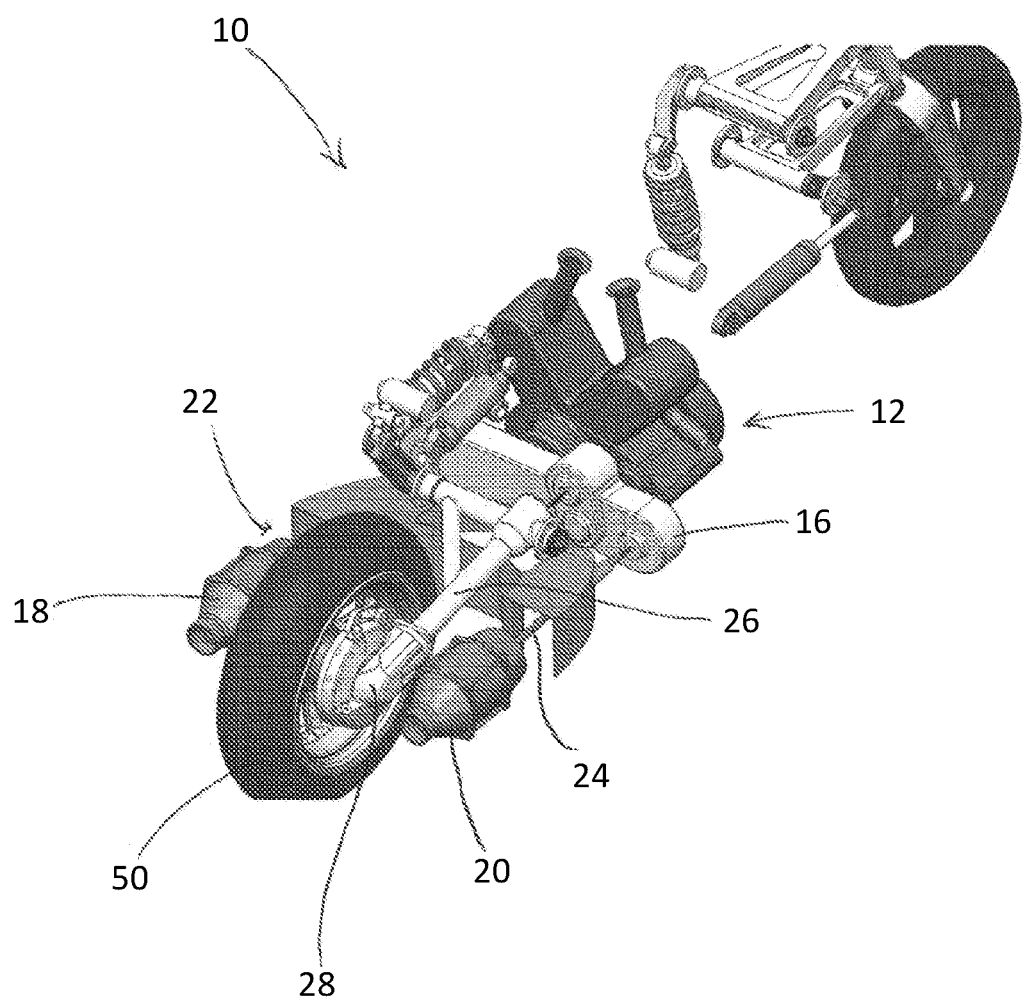

POWERTRAIN FOR AN AMPHIBIAN

CROSS-REFERENCE TO RELATED APPLICATIONS

This application is a continuation of U.S. patent application Ser. No. 16/923,072, filed on Jul. 7, 2020, entitled "POWERTRAIN FOR AN AMPHIBIAN," which is a continuation of Ser. No. 15/579,720, filed on Dec. 5, 2017, entitled "A POWERTRAIN FOR AN AMPHIBIAN," which claims benefit to PCT Application No. PCT/GB2016/051692, filed on Jun. 8, 2016, entitled "A POWERTRAIN FOR AN AMPHIBIAN," the entire disclosures of which are incorporated herein.

BACKGROUND OF THE INVENTION

The present invention relates to a powertrain particularly suitable for use in an amphibian capable of travel on land and water. More particularly, the powertrain is suitable for use in a high speed amphibian with at least one retractable wheel and which is capable of planing on water. The present invention also relates to an amphibian comprising such a powertrain.

Powertrains for use in amphibians are known in the art. These generally fall into powertrains of one of two categories. The first are powertrains for use in displacement only amphibians, and consequently have limited and slow on-water performance. These are generally automotive powertrains modified to provide drive to a marine propulsion unit. The second category comprises powertrains for use in planing amphibians, and which suffer from limited on-land performance. These are generally marine powertrains modified to provide drive to a wheel or a track drive.

More recently, however, the applicant has developed powertrains for use in a new class of high speed amphibians having at least one retractable wheel and which are capable of planing on water. Furthermore, these high speed amphibians provide for good road handling when the amphibian is operated on land.

There remains, however, a need to improve on these prior art powertrains by providing increased flexibility and efficiency, particularly but not exclusively, in the delivery of drive and power to the land propulsion unit(s) (e.g. wheel(s) or a track drive(s)) and the marine propulsion unit(s) (e.g. jet drive(s), propeller(s), etc.) for use of the amphibian on water, as well as improved packaging of the power train. The need to retract wheels and/or wheel suspension assemblies (or track drives and related suspension assemblies) presents significant problems in terms of packaging, weight distribution and also in terms of how the resulting power transmission pathways can be realized.

SUMMARY OF THE INVENTION

Accordingly, in a first aspect, the present invention provides a powertrain for an amphibian operable in land and marine modes, the power train comprising:
  a prime mover having an integral speed change transmission;
    at least a first land propulsion unit;
    at least a first marine propulsion unit; and
    a power transmission unit, wherein:
    the prime mover is arranged to drive the at least first land propulsion unit through/via the integral speed change transmission in the land mode; and
    the prime mover is arranged to drive the at least first marine propulsion unit through/via the power transmission unit in both the marine mode and the land mode.

In a second aspect, the present invention provides an amphibian comprising the powertrain as set forth herein.

With this arrangement, a powertrain according to the present invention is particularly suitable for use in a small high speed amphibian, most preferably an amphibian motorcycle having only two wheels, one front wheel and one rear wheel. It is also suitable for use in a three wheeled amphibian (tricycle) configured in either a) a two front wheel, one rear wheel arrangement or b) a one front wheel, two rear wheel arrangement. The powertrain can have a single prime mover (typically an engine) to drive at least one road wheel and at least one water jet or propeller unit, yet the road wheel(s) can be driven over a suitable speed range on land, and de-coupled on water. The water jet or propeller unit(s) can be driven at a suitable speed relative to engine speed. The present invention provides a compact solution, low drive losses on water, use of neutral in the speed change transmission for road wheel(s) decoupling, and road wheel(s) speed to jet or propeller speed ratio is good on exit of the amphibian from the water. The powertrain according to the present invention also provides for i) dual jet or propeller units where one rear wheel is provided, and ii) a single jet or propeller unit where two rear wheels are provided, thereby giving a balanced or centralized thrust on water (unvectored water thrust, unless steering).

These and other features, advantages, and objects of the present invention will be further understood and appreciated by those skilled in the art by reference to the following specification, claims, and appended drawings.

BRIEF DESCRIPTION OF THE DRAWINGS

Preferred embodiments of the present invention will now be described by way of example only with reference to the accompanying drawing, in which:

FIG. 1 is a schematic perspective view of a powertrain according to a preferred embodiment of the present invention.

DETAILED DESCRIPTION

Referring now to FIG. 1, a power train 10 can be seen to comprise:
  a prime mover, engine 12, with an integral variable speed change transmission;
  a power transmission unit 16;
  two marine propulsion units, port water jet drive 18 and starboard water jet drive 20;
  two marine propulsion drive shafts, port water jet drive shaft 22 (hidden from view), starboard water jet drive shaft 24;
  a land propulsion drive shaft 26;
  a bevel gear transmission 28; and
  rear wheel 50.

The amphibian powertrain 10 comprises an engine 12 having an integral variable speed transmission (gearbox) with a neutral position. As shown in FIG. 1, the engine 12 is mounted transversely in the chassis, although in alternative embodiments this could be adapted or changed (e.g. mounted in-line), with a different layout of power transmission unit 16. The power transmission unit 16 primarily transfers the single drive from the crankshaft of the engine 12 to the two jet drive units 18, 20 (port water jet drive 18 and starboard water jet drive 20) via the two marine propulsion drive shafts 22, 24 (port water jet drive shaft 22 and starboard water jet drive shaft 24). Consequently, drive from the crankshaft of the engine 12 to the jet drive units 18, 20 does not pass through a clutch (if provided) or the integral variable speed transmission (gearbox) of the engine 12. Twin jet drive units 18, 20 are used in this embodiment, one either side of the rear wheel 50. This ensures front and rear wheels are on the vehicle centre, and the water thrust vector is also central, which would not be the case with an offset single jet drive unit.

As noted above, both jet drive units 18, 20 are driven from the crankshaft of the engine 12, and drive does not pass through a clutch (if provided) or the integral variable speed transmission (gearbox) of the engine 12. The power transmission unit 16 takes the single drive from the crankshaft as an input and splits it into a separate drive for each jet drive unit 18, 20. There is provided, therefore, the capability for a ratio change (other than 1:1, if necessary) to provide the optimum jet drive impellor speed. This also ensures that the correct jet drive impellor speed for acceptable thrust at water exit is maintained, which may not be the case if the jet drives are driven through the engine gearbox in the same fashion as the rear wheel 50. In marine mode, the engine gearbox is put in neutral position to de-couple drive to the rear wheel 50. A normal manual clutch or an automatic clutch can be used. Alternatively, an engine with an integral continuously variable transmission (CVT) may be used. Due to the high chain speed, a Hy-vo/silent chain type is used in the power transmission unit 16. Alternatively, a belt or gear system could be implemented in the power transmission unit 16.

In this embodiment, for packaging reasons only, the power transmission unit 16 additionally (but optionally) serves to transfer drive from the integral variable speed transmission (gearbox) of the engine 12 to the rear wheel 50 via the land propulsion drive shaft 26 and the bevel gear transmission 28. With the engine 12 positioned for optimal packaging, the power transmission unit 16 interferes with the direct line between the output of the integral variable speed transmission (gearbox) of the engine 12 and the land propulsion drive shaft 26. Consequently, using the power transmission unit 16 to transfer drive from the integral variable speed transmission (gearbox) of the engine 12 to the rear wheel 50 via the land propulsion drive shaft 26 and the bevel gear transmission 28 provides both the necessary offset for packaging reasons, and also an opportunity for a step-up or step down (input/output ratio) drive to optimize the fixed ratio of input to output speed desired.

In an alternative embodiment, not shown, the amphibian powertrain comprises an engine having an integral variable speed transmission (gearbox) with a neutral position. The power transmission unit comprises a drive shaft assembly to transfer the single drive from the crankshaft of the engine 12 to a single jet drive unit, preferably centrally mounted. Consequently, drive from the crankshaft of the engine 12 to the jet drive unit, 10 as before, does not pass through a clutch (if provided) or the integral variable speed transmission (gearbox) of the engine 12. A single jet drive unit is used in this embodiment, either provided ahead of a single rear wheel (either retractable, or not retractable), or provided centrally between two rear wheels (either retractable, or not retractable). This again ensures that water thrust vector is also central, which would not be the case with an offset single jet drive unit. Drive from the integral variable speed transmission (gearbox) of the engine to the rear wheel (or wheels) is provided via a drive shaft assembly, e.g. land propulsion drive shafts and bevel gear transmission as used in the embodiment described above.

Whilst wheels have been described throughout as the land propulsion means, track drives or individual track drives (i.e. to replace a single wheel) may be used as an alternative or in combination with wheels.

The prime mover has been described above as an engine. The engine takes the form of a multi-cylinder internal combustion engine. Alternatively, any prime mover such as electric, hydraulic, pneumatic, hybrid or otherwise may be beneficially employed.

In marine mode, it has been described above that the engine gearbox is put in neutral position to de-couple drive to the rear wheel(s). A normal manual clutch or an automatic clutch can be used. For example, it is possible to disengage an existing (where provided) internal engine clutch between the crankshaft and the gearbox. An external actuator can be provided to open the clutch, or if a centrifugal clutch is fitted, then a device can be provided to restrict the motion of the centrifugal masses in the marine mode and hence prevent the clutch from engaging. Alternatively, or additionally, an extra external clutch can be provided between engine gearbox output and the driving wheel (s) and used to disengage drive to the wheels in marine mode. This may take the form of an electro hydraulic device, or any other suitable device.

Each feature disclosed in this specification (including the accompanying claims and drawings) may be replaced by alternative features serving the same, equivalent or similar purpose, unless expressly stated otherwise. Thus, unless expressly stated otherwise, each feature disclosed is one example only of a generic series of equivalent or similar features. In addition, all of the features disclosed in this specification (including the accompanying claims, abstract and drawings), and/or all of the steps of a method or process, may be combined in any combination, except combinations where at least some of such features and/or steps are mutually exclusive. Accordingly, while different embodiments of the present invention have been described above, any one or more or all of the features described or illustrated and/or claimed in all of the features the appended claims may be used in isolation or in various combinations in any embodiment. As such, any one or more feature may be removed, substituted and/or added to any of the feature combinations described, illustrated and/or claimed. For the avoidance of doubt, any one or more of the features of any embodiment may be combined and/or used separately in a different embodiment with any other feature or features from any of the embodiments.

Whereas the present invention has been described in relation to what is presently considered to be the most practical and preferred embodiments, it is to be understood that the invention is not limited to the disclosed arrangements but rather is intended to cover various modifications and equivalent constructions included within the scope of the appended claims

The invention claimed is:

1. A power train for an amphibian operable in land and marine modes, the power train comprising:
 a prime mover having an integral speed change transmission;
 at least a first land propulsion unit;
 at least a first marine propulsion unit;
 a power transmission unit including a drive member configured to couple the prime mover to the at least first marine propulsion unit, wherein:
 the prime mover is arranged to drive the at least first land propulsion unit through/via the integral speed change transmission in the land mode; and the prime mover is arranged to drive the at least first marine propulsion unit through/via the power transmission unit in both the marine mode and the land mode; and a second marine propulsion unit, wherein the prime mover is arranged to drive the second marine propulsion unit through/via the power transmission unit in both the marine mode and the land mode;

wherein a crankshaft or other drive shaft of the prime mover is arranged to drive the at least first and/or a second marine propulsion unit(s) through/via the power transmission unit, and drive is not provided through/via the integral speed change transmission on the prime mover; and wherein the power transmission unit provides a fixed input/output ratio.

2. The power train as claimed in claim 1, further comprising a second marine propulsion unit.

3. The power train as claimed in claim 2, wherein the prime mover is arranged to drive the second marine propulsion unit through/via the power transmission unit in both the marine mode and the land mode.

4. The power train as claimed in claim 1, wherein a crankshaft or other drive shaft of the prime mover is arranged to drive the at least first and/or a second marine propulsion unit(s) through/via the power transmission unit, and drive is not provided through/via the integral speed change transmission of the prime mover.

5. The power train as claimed in claim 1, wherein the power transmission unit provides a fixed input/output ratio.

6. The power train as claimed in claim 1, wherein the power transmission unit provides a fixed input/output ratio of 1:1.

7. The power train as claimed in claim 1, wherein the power transmission unit provides a fixed input/output ratio not equal to 1:1.

8. The power train as claimed in claim 5, wherein the fixed input/output ratio is a ratio of input drive speed received from the prime mover to the power transmission unit relative to the output drive speed provided by the power transmission unit to the first and/or second marine propulsion unit(s).

9. The power train as claimed in claim 1, wherein the integral speed change transmission of the prime mover comprises a neutral, and drive from the prime mover to the at least first land propulsion unit through/via the integral speed change transmission is decoupled in marine mode by engaging the neutral.

10. The power train as claimed 1, wherein the power transmission unit provides a fixed input/output ratio of 1:1.

11. The power train as claimed in 1, wherein the power transmission unit provides a fixed input/output ratio not equal to 1:1.

* * * * *